Patented June 20, 1944

2,352,108

UNITED STATES PATENT OFFICE 2,352,108

POWDERED PRUNE COMPOUND AND METHOD OF MAKING THE SAME

Louis La Vine, Burbank, Calif.

No Drawing. Application June 9, 1941,
Serial No. 397,260

7 Claims. (Cl. 99—204)

My invention relates to powdered prune compounds and method of making the same, and its objects are to provide a source of an abundant supply of food elements and vitamins, serving to relieve and counteract deficiencies in the diet and to prevent such diseases as infantile paralysis or similar disorders resulting from deficient food supply: to dehydrate and pulverize prunes under such conditions and at such temperatures so as best to preserve their valuable vitamin content, and to permit their being compounded with other ingredients, to serve as foods for infants, invalids and others suffering from deficiencies in their diet: to utilize as a corrective diet need for animal consumption, prunes with their pit and pit shells unremoved and ground to powder at proper temperatures while mixed with food powders, such as alfalfa or soya bean meal, or both, or admixed with other material elements: to afford a method of producing powdered prune compounds of therapeutic value through the use of germicidal treatments, and pulverization and dehydration at temperatures below or above those injurious to the vitamin content. Other objects will appear as hereinafter set forth.

It is a matter of general knowledge among scientists that prunes are very rich in vitamins, minerals and chemicals. In fact, it is recognized by scientists that dried prunes contain more vitamin B1 than any other fruit, and are about ten times as rich in riboflavin, one of the "B-complex" vitamins, as in fresh milk.

Vitamin B1, chemically known as thiamin, is a nerve tonic and has achieved some amazing results in the treatment of mental ailments and in certain cases of paralysis. Riboflavin, also known as vitamin B2, and sometimes as vitamin G, is a promoter of cell growth and an aid to the eye, skin and gastro-intestinal cells.

I have discovered through a series of exhaustive experiments that prunes from which the pits have been removed, and properly dehydrated and pulverized at required temperatures, form a product which is easily assimilated through the mouth, lingual route, the stomach and alimentary canal.

Such prune powder can be used with the baby's formula, or in Jello or other desserts and may be spread with butter upon bread, affording not only food but also the essential vitamins, minerals and chemicals for the child. The expectant mother will find my prune powder and milk her best food, since they will fulfill the body requirements of both the mother and child, and will prevent the loss or decay of teeth and other ills which often occur through pregnancy by reason of mal-nutrition. Mother's milk loaded with certain vital materials necessary for the child's health and growth can be produced by specialized feeding of the mother during pregnancy and the nursing period.

I have found from painstaking research that by determining deficiencies of certain vitamins in the mother, and by the use of foods specializing and corrective, such deficiencies, especially by supplying bone-building calcium and other vital minerals such as are obtained from my prune and other fruit powders, there will be insured a normal, healthy child, and normal, healthy growth of the child during the nursing period.

Such foods may be introduced into the human system through different channels through the consumption of such foods as milk and dairy products produced from milch cows and goats fed on foods containing the minerals: or, more advantageously by the use of proper amounts of my prune and other fruit powders in making food products tasty as well as supplying the necessary vitamin ingredients. The special feeding of milch cows and goats with my said fruit powders, particularly when combined with other minerals and vitamins, produce the same effect in vitalizing the milk of said animals, and the same reaction in the growth and development of the child or adult person.

The improvement in the specialized feeding of fowls by introducing my prune powder when combined with alfalfa, etc. is marked, and the vitamins and minerals are carried into the fertility of the egg, increasing the vitamin content, as well as into the meat of the fowl, and the shell of the egg is more firm, saving loss by cracked eggs.

So far as the human being is concerned the best means of assimilating the minerals is through the natural and easily digested foods, such as milk combined with my prune powder. Thus, my prune powder combined with cereals, etc. acts as a sweetener, making a more palatable food and supplying needed vitamins, minerals and chemicals for the growing body, thereby maintaining a well balanced body building food supply with the least effort or strain on the digestive tract and organs.

My prune powder which contains vitamin B1 and A, and to which I have added di-calcium phosphate, chlorophyl and vitamin C and collodial sulphur, will when fed to prospective mothers and their offsprings, or to other adults, in proper proportions, serve as a preventative of infantile paralysis or poliomyelitis, and will assist in retarding and in restoring those afflicted, provided the branches of the nerves are not completely dead or tending toward total destruction.

Therefore, vitamin B1 acts on the prevention of the deterioration of the spinal cord; di-calcium or calcium and phosphorus are necessary for the repair of and new cells of the spinal cord: sulphur radical is essential to life and it is also death to harmful bacteria such as streptococcus: vitamin A acts on certain types of infection and virus and vitamin C is essential to proper calcium metabolism along with vitamin D; therefore, the combination in colloidal form, or in the powdered form, is more easily digested and assimilated in the alimentary canal without entering all in the stomach, and with the addition of elements found in my prune powder along with whey and chlorophyl can prevent, if taken properly, infantile paralysis or poliomyelitis, or Heine medin disease.

Phosphate and calcium are found in every cell of the human system, and are essential for the formation of all new cells. Lack of such element is indicated through certain well known symptoms such as anaemia, delay in bone formation, slow healing of fractures, and rachitis when present in children.

My prune powder to which calcium has been added, I have found will promote the building of all of the cells of the body, and will be of great value in cases of mal-nutrition and emaciation.

Prune powder such as manufactured by me may also be combined with ice cream, fruits and other delicacies, making them more tasty, as well as furnishing the foods necessary for a well balanced body.

The steps in making my prune powder are preferably as follows:

First, I extract the seed from the ripe plum or prune by hand or by the use of any of the well-known machines in common commercial use. After seeds have been so removed, I place the prunes in a dehydrating chamber, such as is commonly used for such purposes, taking care however, to expose the fruit at a temperature ranging between 100 and 140 degrees Fahrenheit, or a temperature by which the natural fruit color, flavor and sugar is retained, as well as the minerals and chemicals in the form of calcium, potassium, phosphorus, sodium, iron, magnesium, manganese, copper, chlorine, and sulphur, furnishing vitamins A, B1, B2 and G. The dehydrated product is then ground to a powder, taking care that during the said grinding the product is not exposed to any greater or lesser range of temperature than those employed in dehydrating, as aforesaid. In effecting such pulverization, I preferably employ any well known commercial grinders or milling apparatus commonly used for milling grains, nuts or similar food products. The fineness of the powder is to be regulated in accordance with the purpose for which it is to be used. If for animals, the powder should be somewhat coarse, while, if for human consumption, the powder should be ground very fine in order to provide for ready assimilation.

To this prune powder, so produced, may be added other food products in order to meet deficiency requirements. Thus such other fruits or nuts may be dehydrated and reduced to a powder, then added to my improved prune powder in sufficient quantity to meet the particular requirement.

Thus, my improved prune powder, mixed with lemon powder, in the proportion of about four-fifths prune powder to about one-fifth lemon powder, will be found helpful in the treating of scurvy, weakness of intercellular tissue, blood vessels and walls, teeth, gums, friability of bones, pyorrhea, adrenal function and nerve control of the heart.

Also prune powder mixed with di-calcium phosphate and milk, or other ingredients carrying vitamin D, in the proportion of approximately 400 to 1,500 U. S. P. may be used for the prevention and relief of rhinitis, tuberculosis, anaemia and other nerve, blood and muscular diseases.

When utilized for human consumption, I prefer to use a powder made from plums or prunes with the pit left out, except the kernel, in which case I preferably employ 100% prune powder with or without di-calcium phosphate powder, two-and-one-eighth more or less, for the assistance of calcium metabolism; phosphate or phosphorus organic to supply what might be destroyed by heat, also, one per cent, more or less, of lemon powder with vitamin C for the benefit of calcium metabolism, and should I care to mix said powder with vitamin D, we could get the benefit of vitamin D assimilation, otherwise, vitamin D might go into a poison known as vitamin D toxicant, if calcium phosphorus vitamin C was completely missing, as well as vitamin B-complex.

I also find it desirable in producing my improved prune powder, or compounds thereof, particularly when used for animal consumption, to grind the same with alfalfa or soya bean meal, or both, care being taken in grinding, that temperatures ranging outside of 100 to 140 degrees Fahrenheit are not developed. Preferably the prunes after being dehydrated are mixed with the meal, and then carefully ground together with the same to form a powder. Where either the alfalfa meal or the soya bean meal is used alone with the prune powder, the proportion should be about 50% for either ingredient. However, where both the alfalfa and the soya bean meals are used with the prune powder, the proportion should be about 50% prunes to 25% each of the alfalfa meal and the soya bean meal ingredient. The proportions of the above mentioned meals to the prune content are those which have been favorably employed by me as a general formula. However, such proportions may be varied as found necessary by the exigencies of the case. Thus, the prune powder of the compound may be lessened or increased as found necessary in treating animals or fowls, as desired.

Potassium is found in considerable quantity in alfalfa and when united with hydrogen and oxygen, forms a superabundance of gas, so that, when alfalfa is taken into the stomach of a horse or a cow, it will ordinarily unite with the hydrogen and oxygen of the water in such stomach contained, and gas will be created in such quantity as to cause distention, distress or possibly death, if the alfalfa is taken into the stomach in sufficient quantities. To avoid such effects, alfalfa is ordinarily fed to animals in very limited amounts, but where taken in larger amounts, as for instance, when an animal escapes into an alfalfa field, an excessive amount of alfalfa may be consumed with the said dangerous result, and the amount of gas created may be such as to require surgical treatment to relieve the animal. In many instances bicarbonate or sodium chloride, if properly administered, will afford relief. Where, however, alfalfa meal is combined with my prune powder as hereinbefore described, it will be found that any gas effect produced by the consumption of alfalfa will be largely neutralized by the sodium chloride found in the prune powder, plus its laxative effect, thereby absorbing or assisting in expelling the gas.

Also, in carrying out by improved process, and as a variation thereof, I have found it desirable preparatory to the dehydration and pulverization of the prunes, to immerse the prunes in a sulphur solution of strength sufficient to remove bacteria from the surface thereof, while not in any way operating to impair or injure the said prune for human, animal or fowl consumption.

In this connection I have discovered that while heavy sulphur compounds tend to produce deleterious effects upon human beings, nevertheless the employment of a colloidal product of sulphur, such as for example, the product well known as Wilson's sulphur solution which is a colloidal solution of pure sulphur from which substantially all impurities have been removed, may be employed with beneficial results for removing the bacteria on the skin or outer surface of prunes. Since such solution is an absolutely pure product of sulphur, which becomes colloidal upon dilution merely with water, it can be safely offered for human consumption. Its germicidal value has been tested medically as being greater than comparative strengths of phenol, so that it may act on fruit either as a bacteriostatic or bactericidal agent.

Preferably I employ in such treatment ten to twenty drops of sulphur solution to eight ounces of water, and preferably I immerse the prunes in such solution for a period of eight hours or more, although if the sulphur is absorbed by the prunes, the interchange may be effective within one hour as completely as it might be in a longer period. As so applied to the prunes the quantity of sulphur used acts entirely as a therapeutic agency, and when taken internally when the fruit is consumed by human beings, animals or fowls, is entirely safe and adds to supplement the food value of the fruit itself by increasing the usable sulphur content.

As is obvious, this sulphur treatment of prunes also may be utilized in treating other kinds of fruit, whether or not the said fruits are to be reduced to powdered form; the main object of the treatment being to afford a preservative, to bleach and to prevent bacterial decay.

In order to produce the elements that are found in a healthy plum or prune, the soil should contain similar elements, other than the elements which are created through sunshine, heat and water, which create chemistry such as the sugars found in fruits, consequently soil which contains those elements will produce much richer fruit. For example, rhubarb should contain calcium, and there should be lime in the soil in which it is grown, otherwise the rhubarb will be deficient in calcium; tomatoes should contain iodine, and there should be iodine in the soil where tomatoes are grown, otherwise they will be deficient in iodine, so, if the soil is lacking in the elements which the plum or prune should contain, the elements must be supplied to produce the perfect prune or plum, and it is my purpose to extend this treatment of soil for the inclusion of the necessary chemicals in all fruits and edible products for both human and animal consumption.

While in producing my improved prune powder, I preferably use prunes from which the pits had been removed, nevertheless, I have found in preparing my product for animal and fowl consumption, it is desirable and advantageous to utilize the entire prune without removing the pit; the prunes, however, to be dehydrated and pulverized together with the said pit at the temperature and under the conditions hereinbefore described.

I also find my invention an advantage in making the form thereof as embodied in my prune butter, in which the ingredients are prune powder 30%; dry calcium phosphate 5%; vitamin C 1%; vitamin D 1500 U. S. P. units; chlorophyl 5%; butter fat 2%, and the balance in whey. This formula may be varied in accordance with the purposes desired in the treatment of patients or dietary conditions of the individual. Thus the element of butter fat may be eliminated in cases where reduction in weight is required, and in various complications, such as diabetes and where fever is present. Also the vitamin and mineral content may be increased or diminished where necessary or advisable. This formula would be found particularly beneficial in cases of pellagra and infantile paralysis. Said butter is used in place of ordinary butter, oleomargarine, or other spreads, and may be used alone as a food. Colloidal sulphur may also be used with this formula for the enrichment of food content and bactericidal and bacteriostatic action.

Also, as another modification within the spirit and purpose of my invention, I embody the same in my prune cheese, in which I unite with any of the well-known cheeses now on the market, my prune powder in such proportion as will best blend with the cheese and secure the desired dietetic result, plus dried calcium phosphate and colloidal sulphur.

By the words "colloidal sulphur" as used in the claims I desire to be understood as meaning an isotopic colloidal solution of sulphur, or sulphur which remains in a fine state of dispersion indefinitely without saturation or precipitation and is in a form readily assimilable by the human body without the deleterious effects of flower of sulphur or any other form of sulphur or sulphur compound injurious to mankind, whether the same be taken alone or with fruits, vegetables or other foods.

In the claims where I refer to "temperatures ranging between one hundred degrees and one hundred and forty degrees Fahrenheit," or where I use similar language I intend to be understood as meaning a range of temperatures at atmospheric pressure, or temperatures which in vacuo produce a corresponding or equivalent effect whether within or without said range.

My invention may be carried out in other ways or embodied in other forms without departing from the spirit or essential characteristics thereof, the scope of my invention being indicated by the appended claims rather than by the foregoing description, and all changes which come within the meaning and range of equivalency in the claims are therefore intended to be embraced therein.

What I claim and desire to secure by Letters Patent is:

1. The method of preparing a desiccated prune product which comprises removing the pits from the fruit, soaking the fruit to saturation in water having dissolved therein a colloidal solution of sulphur from which substantially all impurities have been removed, then dehydrating to a powderable mass the fruit so treated by the aid of heat, and then grinding the dried fruit into powder within a temperature range of one hundred to one hundred forty degrees Fahrenheit.

2. The method of preparing a desiccated prune product which comprises removing the pits from the fruit, soaking the fruit in a liquid composition of colloidal sulphur solution dissolved in water, in the proportion of ten to twenty drops of such solution to about eight ounces of water, until the sulphur has been absorbed by the fruit and the bacteria removed from the surface thereof, then dehydrating to a powderable mass the fruit so treated, and then grinding the dried fruit to powder within a temperature range of one hundred to one hundred forty degrees Fahrenheit.

3. A method of preparing a desiccated prune product which comprises removing the pits from the fruit, soaking the fruit for not less than eight hours in a liquid composition containing a colloidal solution of substantially pure sulphur in the proportion of ten to twenty drops of such solution to eight ounces of water, then dehydrating to a powderable mass the fruit so treated by the aid of heat within a temperature range of one hundred to one hundred forty degrees Fahrenheit, and then grinding the dried fruit into a powder within a temperature range of one hundred to one hundred forty degrees Fahrenheit.

4. A food product comprising dehydrated ground prune powder impregnated by substantially pure sulphur in a finely divided form readily assimilable by human body fluids when brought in contact therewith.

5. The method of preparing a desiccated fruit product, which comprises soaking the fruit to saturation in water having dissolved therein a colloidal solution of sulphur from which substantially all impurities have been removed, then dehydrating to a dry powderable mass the fruit so treated by the aid of heat, and thereupon grinding said mass into powder.

6. The method of preparing a desiccated fruit product, which comprises soaking the fruit to saturation in water having dissolved therein a colloidal solution of sulphur from which substantially all impurities have been removed, then dehydrating to a dry powderable mass the fruit so treated by the aid of heat, and then grinding the said mass into powder within a temperature range of 100 to 140 degrees Fahrenheit.

7. The method of treating fruit, which comprises soaking the fruit to saturation in water having dissolved therein a colloidal solution of sulphur from which substantially all impurities have been removed, and then dehydrating the fruit so treated by the aid of heat.

LOUIS LA VINE.